United States Patent [19]
Faynberg

[11] Patent Number: 5,664,102
[45] Date of Patent: Sep. 2, 1997

[54] INTELLIGENT NETWORK INTERNETWORKING ACCESS ARRANGEMENT

[75] Inventor: Igor Faynberg, East Brunswick, N.J.

[73] Assignee: AT&T, Middletown, N.J.

[21] Appl. No.: 385,013

[22] Filed: Feb. 7, 1995

[51] Int. Cl.⁶ .................................................. G06F 13/00
[52] U.S. Cl. ............... 395/200.76; 379/207; 395/200.79
[58] Field of Search .................... 395/200.02, 200.06; 379/207, 63, 91, 67, 112, 212, 216, 225

[56] References Cited

U.S. PATENT DOCUMENTS

| | | | |
|---|---|---|---|
| 5,247,571 | 9/1993 | Kay et al. | 379/207 |
| 5,422,941 | 6/1995 | Hasenauer et al. | 379/207 |
| 5,504,804 | 4/1996 | Widmark et al. | 379/63 |
| 5,513,250 | 4/1996 | McAllister | 379/91 |
| 5,541,917 | 7/1996 | Farris | 370/60.1 |
| 5,553,119 | 9/1996 | McAllister et al. | 379/67 |
| 5,572,583 | 11/1996 | Wheeler, Jr. et al. | 379/207 |

*Primary Examiner*—Mehmet B. Geckil
*Attorney, Agent, or Firm*—Robert B. Levy

[57] ABSTRACT

All existing services that can be offered in one telecommunication network can be offered across networks without changing any existing interfaces and protocols. A mediation access processor (MAP) is provided in a network element located in a first network that is interconnected with a second network. The MAP provides screening, translation and emulation functionality, so that (a) messages transmitted between switches in the first network and SCP's or other application processors in the second network can be properly converted so as to be recognized and understood, (b) changes to the intercommunication arrangements of the switches and the SCP's, such as the protocols that are supported, are not necessary.

24 Claims, 6 Drawing Sheets

PRIOR ART

5,664,102

INTELLIGENT NETWORK INTERNETWORKING ACCESS ARRANGEMENT

FIELD OF THE INVENTION

The present invention relates generally to the interconnection of element in different telecommunications networks, and in particular, to the provision of intelligent network support services across network boundaries. The present invention also contemplates an arrangement by which elements in different networks may be interconnected so that, for example, a switch disposed in one network may communicate with a controlling computer, such as a service control point (SCP) in another network.

BACKGROUND OF THE INVENTION

The Intelligent Network (IN) is the name given to a collection of network elements, including (a) service switching points (SSP's), that are also commonly referred to as switches, (b) controlling computers, such as a service control points (SCP's), and (c) voice processing and announcement platforms and messaging platforms, which are collectively sometimes referred to as intelligent peripherals (IP's). The enumerated elements, as well as other known network elements, must effectively communicate with each other in order to provide centralized support and rapid introduction of a wide range of telecommunications services. The functionally provided to a given intelligent network call is ascertained by executing service logic programs stored in different network elements and controlled in an SCP. As long as the elements involved in processing a given call are part of the same network, provision of such services is convenient and feasible, because the intra-networking interfaces between the elements, which may be provided by different vendors, are standardized. For example, messages that invoke the services logic programs can be transmitted form the switch that receives a call, to the SCP in the same network that contains the service logic program, via a Signaling System No. 7 (SS7) message transmitted in the Intelligent Network Applications Part Protocol (INAP) format.

When the elements that are involved in processing a given call are not part of network in which the switch processing the call is located, the provision of intelligent network supported services is more complicated. The complications arise from the fact that the network providers are reluctant to allow their switches to receive call processing instructions from an element outside of their own networks, due, at least in apart, to potential problems that can arise due to interconnection and that may jeopardize switch integrity. Different network providers are also unwilling or unable to convert the elements in their networks to handle protocols used by other networks. For example, certain networks are maintained by interexchange carriers (IXC's), such as AT&T, MCI and Sprint; other networks are maintained by local exchange carriers (LEC's) and regional Bell operating companies (RBOC's), such as Bell Atlantic and NYNEX, respectively, and yet other elements involved in supporting intelligent network services are maintained by service providers that do not own networks, such as utility companies.

Presently, the interfaces between IN network elements in the same network are implemented or supported by a standardized protocol, known as INAP (part of the ITU Capability Set 1 (CS-1) intelligent network recommendations). However, INAP cannot be used to implement acceptable interconnection between a switch in one network and a database in a foreign network. Present arrangements allow a service control function (SCF) part of an SCP in one network to launch a query directly to a service data function (SDF) part of an SCP in another network. However, the information obtained in response to such a query is very limited, and is service independent. This existing query capability thus does not allow the provision of intelligent network services across networks.

Presently, regulatory bodies in various foreign countries (as well as in the United States) require network operators to open their networks to independent service providers. However, such openness has not yet been achieved. The present invention provides the technical details for achieving such openness.

SUMMARY OF THE INVENTION

I have recognized the need for an open inter-networking interface that does not jeopardize switch integrity and at the same time requires no changes to the existing standards and implementations. The interface must be flexible as far as physical implementation is concerned, must take account of integrity concerns, must solve the issue of the use of different INAP options by the involved networks, and, most importantly, must preserve existing implementations, which conforming to existing standards, such as CS-1 and pre-standard (e.g., AIN 0.1, ETSI Core INAP) implementations.

In accordance with the present invention, all existing services that can be offered in one network can be offered across networks without changing any existing interfaces and protocols. A mediation access processor (MAP) is provided in a network element located in a first network that is interconnected with a second network. The MAP provides screening, translation and emulation functionality, so that (a) messages transmitted between switches in the first network and SCP's or other application processors in the second network can be properly converted so as to be recognized and understood, (b) changes to the intercommunication arrangements of the switches and the SCP's, such as the protocols that are supported, are not necessary.

BRIEF DESCRIPTION OF THE DRAWING

The present invention will be more fully appreciated by consideration of the following detailed description, which should be read in light of the accompanying drawings in which.

DETAILED DESCRIPTION

Figure 1:
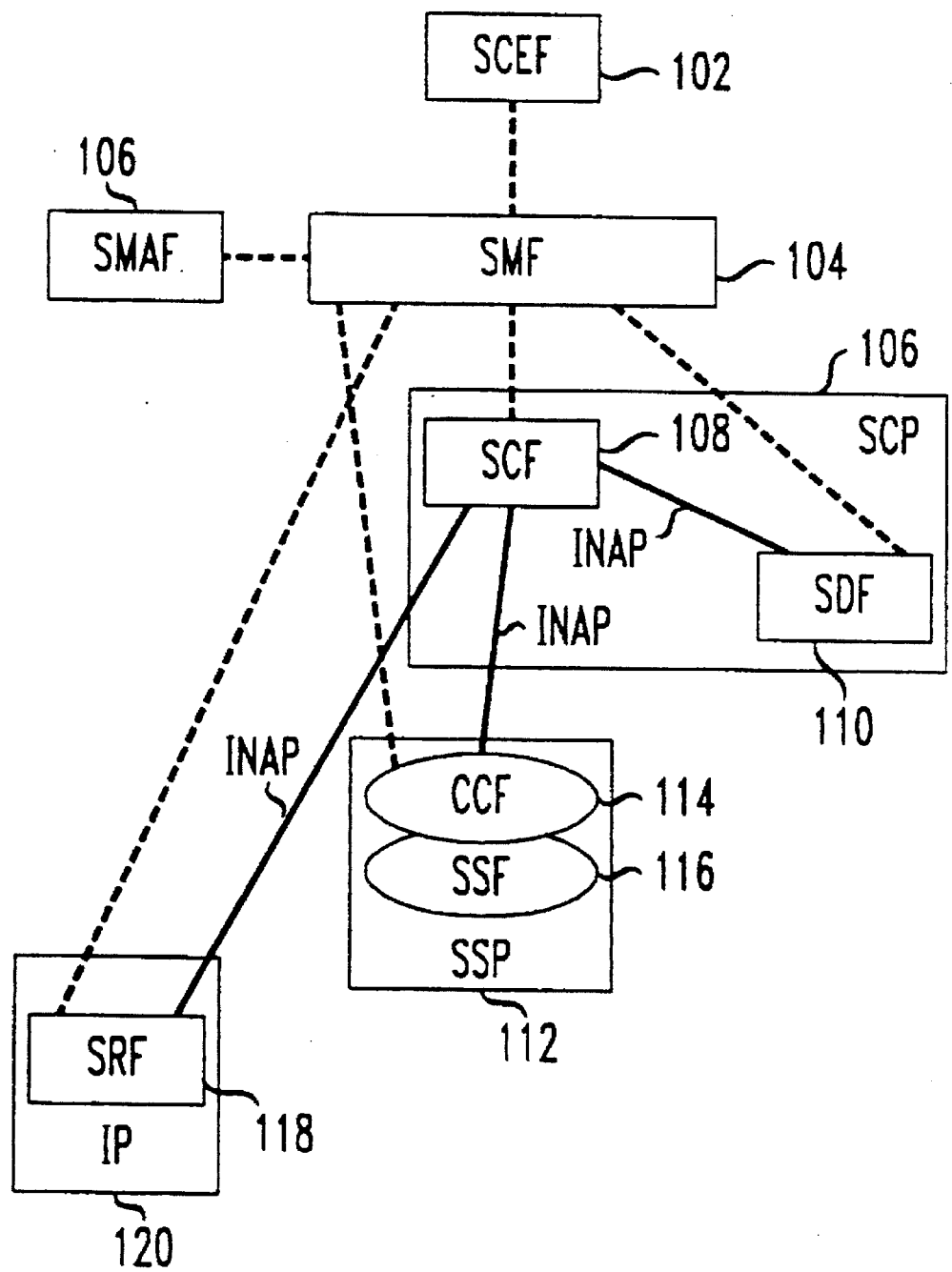
FIG. 1 is a block diagram illustrating the conventional interconnection among various network elements in a single communication network.

Referring first to FIG. 1, there is shown a block diagram illustrating the conventional interconnection among various network elements in a single communication network. FIG. 1 thus illustrates the current state of the industry agreement on interfaces and reflects the ITU-T Recommendations Q.1214 and Q.1211.

In FIG. 1, SSP 112, which may be a 5ESS® program controlled electronic switching system available from AT&T Corp., includes a pair of modules that have different functions, namely an SSF module 116 performing a service switching function and a CCF module 114 performing a call control function. A controlling computer or service control point (SCP) 106, which may be an A-I-NET® SCP available from AT&T Corp., also includes a pair of modules that have different functions, namely an SCF module 108 performing a SCF service control function, which is responsible for the execution of Service Logic Programs (SLP's), and an SDF module 110 performing a service data function. Basically, SDF module 110 is merely a service-independent data repository.

In FIG. 1, an intelligent peripheral (IP) 120 can include an SRF module 118 arranged to perform a specialized resources function. Such a function can, for example, be performed by an A-I-NET SCN (service control node) available from AT&T Corp.

Three additional modules are shown in FIG. 1, including an SMF module 104 that performs a service management function, an SCEF module 102 that performs a service creation environment function, and a SMAF module 106 that performs a service management agent function. These modules have no standardized interfaces to the rest of the remaining modules shown in FIG. 1. Rather, these modules or elements are interconnected by proprietary means, so that these modules and interfaces cannot be used consistently in multi-network or multi-service-provider environments. Thus, only the SCF-to-SDF, SCF-to-SSF/CCF, and SCF-to-SRF interfaces have been standardized; together, these interfaces constitute the Intelligent Network Application Part Protocol (INAP), which does promote inter-vendor operability. Notwithstanding the foregoing, these interfaces do not meet inter-networking requirements, as will be seen more clearly in connection with FIG. 2.

Figure 2:
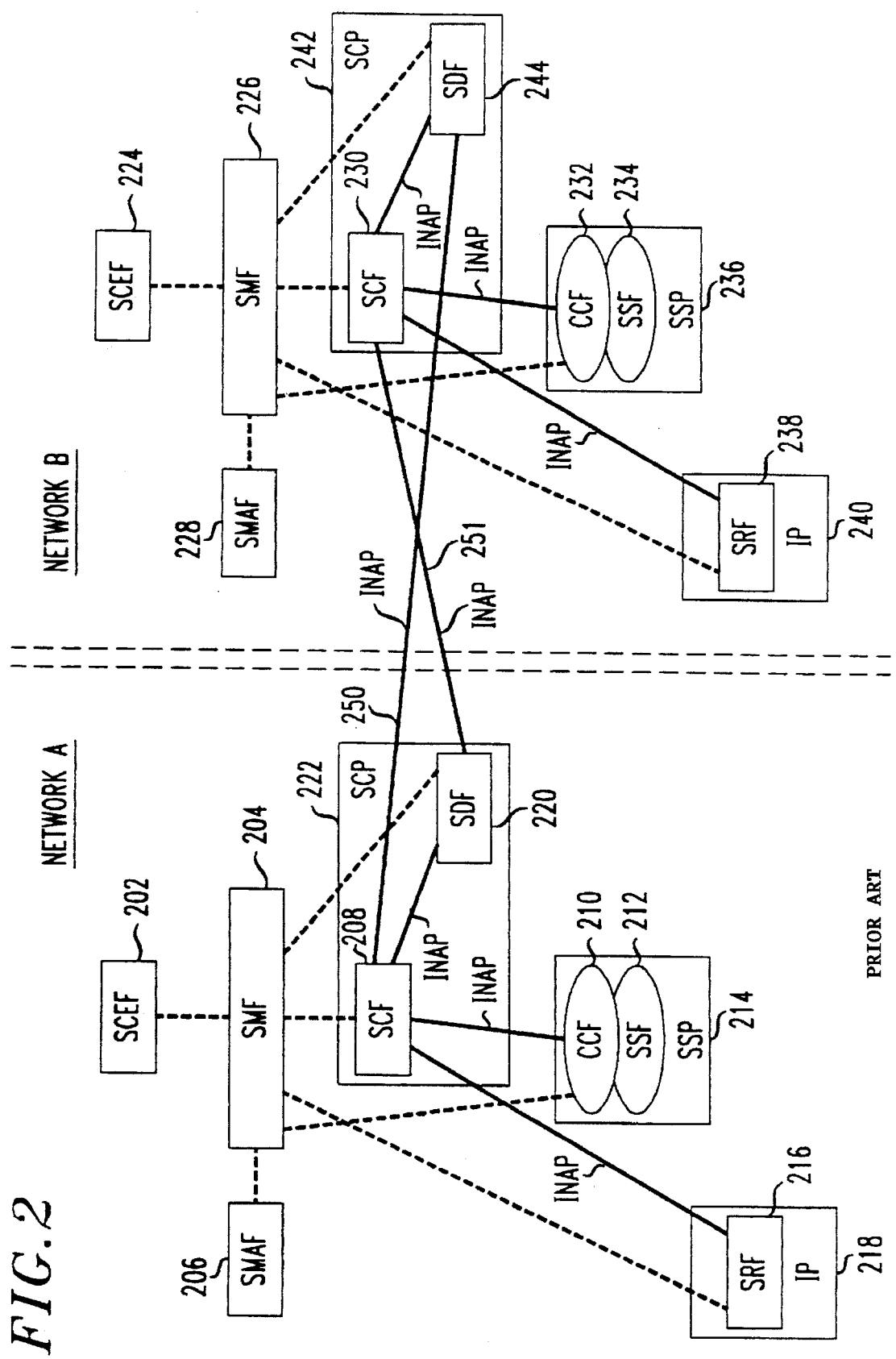
FIG. 2 is a block diagram illustrating how the various network elements of FIG. 1 would be conventionally interconnected with similar elements in a second communication network.

FIG. 2 is a block diagram illustrating how the various network elements of FIG. 1 would be conventionally interconnected with similar elements in a second communication network. On the left hand portion of FIG. 2, a first network, Network A, includes all of the elements shown in FIG. 1. On the fight hand portion of FIG. 2, a second network, Network B, also includes all of the elements shown in FIG. 1. Note here that it is not necessary that Networks A and B have identical elements.

As shown in FIG. 2, the only inter-networking interfaces between elements in Networks A and B are (a) the interface 250 between SCF 208 and SDF 244, and (b) the interface 251 between SCF 230 and SDF 220. These interfaces use the INAP protocol, as set forth in ITU-T Recommendations Q.1211 and Q.1218. These interfaces are limited to the extension of database queries from the SCF to the connected SDF, and to the transmission of query responses from the SDF back to the SCF. These interfaces specifically exclude any exchange of service-related information, since all such information is, by definition, contained in the SCF.

The existence of such interfaces, which are in fact very limited, does not allow a service provider to offer a service across network boundaries, which is further explained as follows. Consider the case when Network B is the service provider. Then the service logic program for a service is located in SCF 230. To perform the service, SCF 230 would need the call-related information (including the initial query from SSP 214) and SCF 230 would also need to send instructions to SSP 214 as well as to SRF 216. But SCF 230 cannot perform any of these actions, because its only connection is to SDF 220 and not to any of the network elements that establish and maintain the call. If SCF 230 had had an interface (via INAP) to SCF 208, some relaying of the call-related information between Network A and Network B could have possibly remedied the problem (although at high performance cost), but such an interface is not supported by INAP.

The limitations of the present interconnection arrangement shown in FIG. 2 will be further illustrated by an example. Consider a service provider who desires to provide a service that announces the names of pieces of music currently being played by various classical music stations around the United States. The service provider desires to advertise an 800 number, which, once called, could connect the caller to a platform or device. The platform would, in turn, prompt the caller for the identity of the station in question (if there are more than one classical music station in the caller's area), and, based upon the response and information identifying the geographical place whence the call comes from, announce to the caller the name of the piece currently being played (e.g., Prokofiev's Violin Concerto No. 1). Currently, such a service could be offered only by a network provider that owns or controls the whole range of network equipment. This is because, with the current arrangement and limitations shown in FIG. 2, the service would have to be implemented only on the SCP of the network provider.

A much more optimal way of providing the same service, and a way that is much more beneficial to the service provider, would be for the service provider, who owns just a computer, i.e., an SCP, with the service logic necessary for the service and who has a connection to the well known SS7 signaling network, to receive an INAP query from the first IN switch in which the call originates. From this query, the service logic inside the service provider's SCP could detect the geographical place whence the call comes from, check its database, and instruct the switch to connect the caller to an appropriate device that would prompt him or her to identify the station in question. Based upon the caller's response, the piece currently being played (again, based on the database information) could be identified. The network provider in this arrangement would be paid only for the resources used in the network; in addition, the service logic could be easily changed by the service provider without requiting any change to be made to the network.

Figure 3:
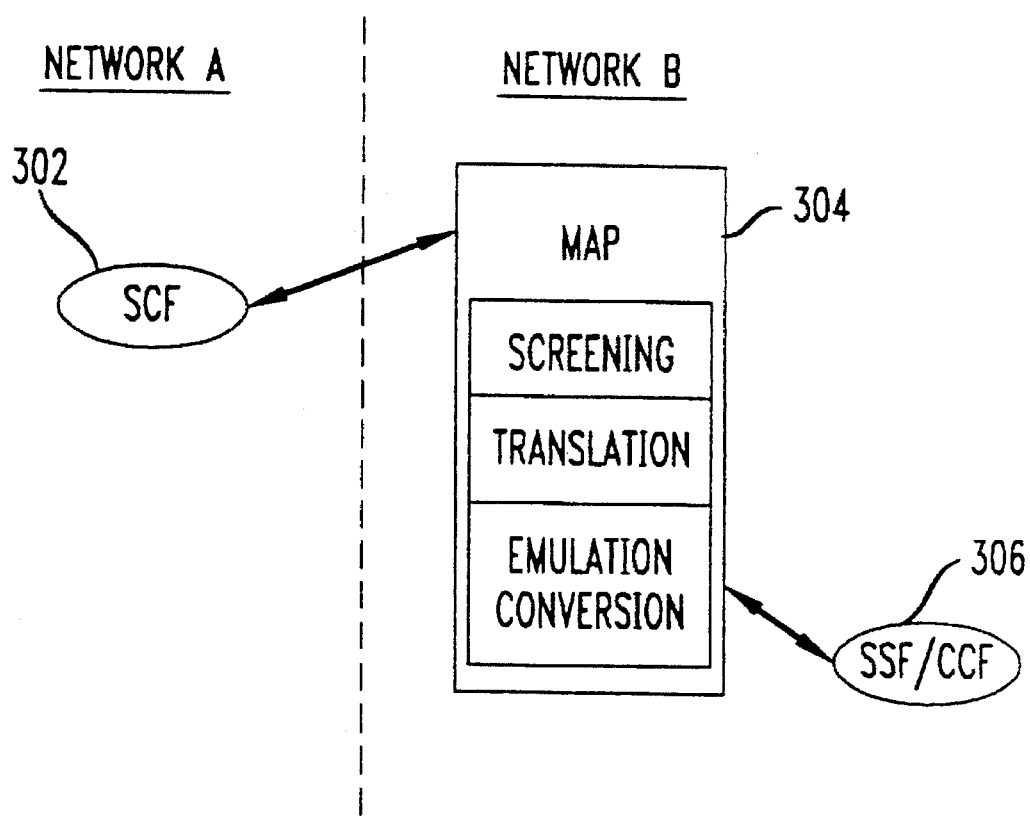
FIG. 3 is a diagram illustrating the arrangement of a MAP in accordance with the present invention, to interface between a SCF in a first network and an SSF/CCF in a second network.

Referring now to FIG. 3, there is shown a diagram illustrating the arrangement of a mediation access processor (MAP) 304 in accordance with the present invention, that acts as an interface between SCF 302 in a first network, Network A, and an SSP 306 (including SSF/CCF modules) in a second network, Network B. Note that MAP 304 is located in the same network (NetWork B) with SSP 306. MAP 304, although illustrated in a separate element, can be easily implemented inside of an SCP.

Functionally, as shown in FIG. 3, MAP 304 provides three separate functions in three modules. First, a screening function is provided in screening module 308; second, a translation function is performed in translation module 310, and third, an emulation function is performed in emulator module 312. The functionalities of each module are described in detail below in connection with FIG. 4.

The MAP 304 of FIG. 3 provides an emulation function at the interfaces between SCF 302 and SSF/CCF 306, that is dependent upon the direction in which signaling messages are passed between these elements. First, MAP 304 operates at the SCF to SSF interface as though it is an SSF/CCF, thus using any existing INAP option (such as the SSF Application Service Element (ASE), as described in ITU-T Recommendation Q.1218, or Bellcore AIN 0.1 option, or ETSI Core INAP option) supported by the SCF. Second, MAP 304 operates at the SSF/CCF to SCF interface as though it is an SCF, thus using any existing INAP option (SCF Application Service Element (ASE), as described in ITU-T Recommendation Q.1218, or Bellcore AIN 0.1 option, or ETSI Core INAP option) supported by the SSF/CCF, independent of the option used by the other side. For example, the SSF/CCF may use the AIN 0.1 INAP, while the SCP may use ETSI CORE In addition to the emulation function just described, MAP 304 performs a translation function if needed because of different options in the SCF 302 and SSF/CCF 306. In addition, it performs a screening function on behalf of Network B as deemed necessary by the network provider wishing to protect the switch and network integrity.

Figure 4:
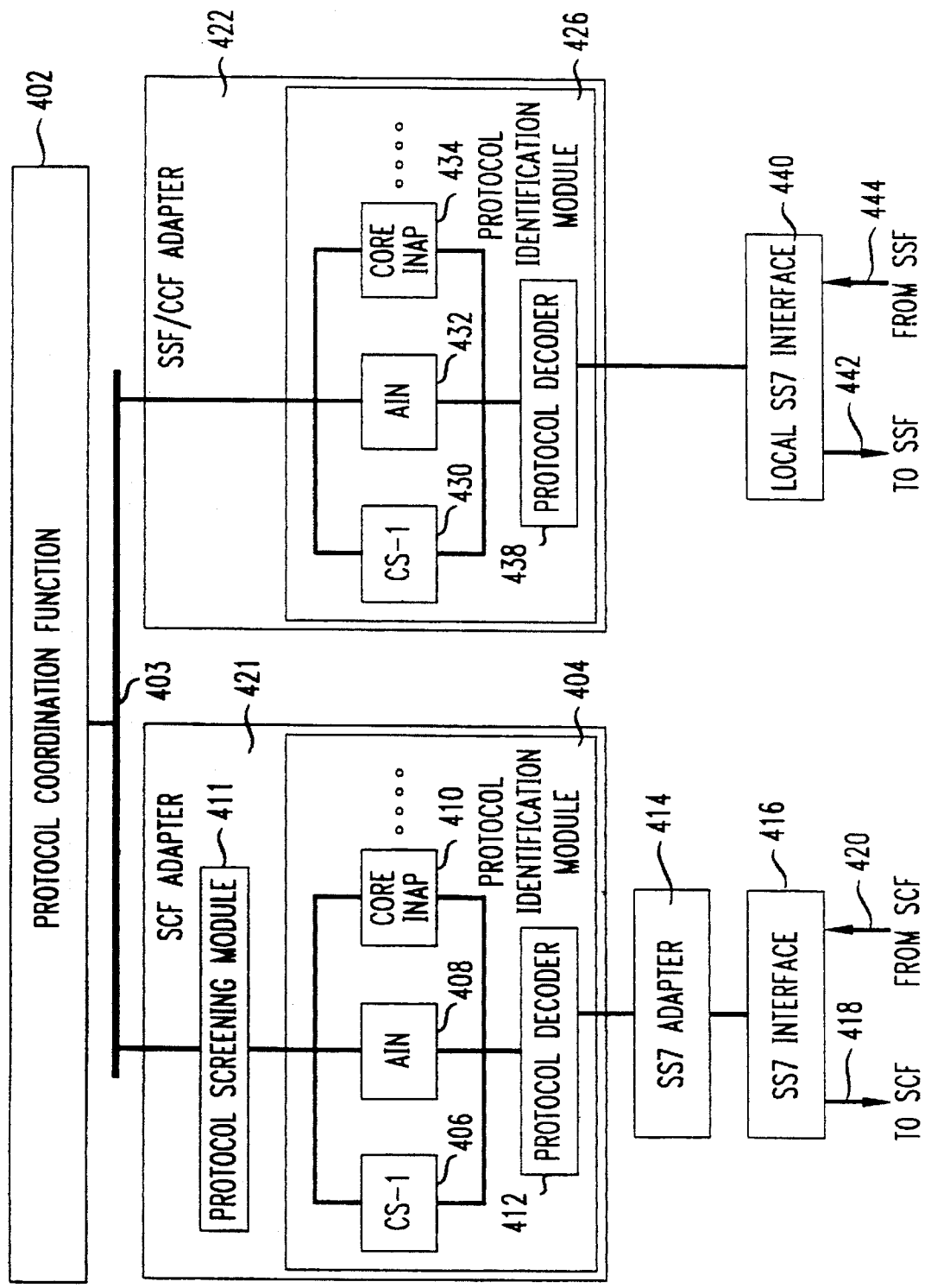
FIG. 4 is a block diagram illustrating the arrangement of the modules within MAP 304 of FIG. 3.

Referring now to FIG. 4, there is shown a block diagram illustrating the arrangement of the modules within MAP 304 of FIG. 3. At a high level, it is seen from FIG. 4 that the MAP has two principal components, namely (a) an SCF adapter 421 and (b) an SSF adapter 422. SCF adapter 421 and SSF adapter 422 are interconnected to each other through a bus 403 which connects both modules to a protocol coordination function (PCF) module 402, which conveys (and, if necessary, converts the format of) the messages between SCF adapter 421 and SSF/CCF adapter 422. PCF module 402 just passes the messages when no translation is needed, or sends respective error and rejection messages back in accordance with the error procedures on the respective side.

A protocol screening module 411 is included in SCF adapter 421 in order to protect the network from unwanted or erroneous (respective to the given state of the network) messages. Protocol screening module 411 sends back an error message to the SCF when such a message has been detected. Protocol screening module 411 is present only within SCF adapter 421 (and not SSF/CCF adapter 422) because only the messages coming from the foreign network need to be screened.

Implementationally, protocol screening module 411 can be an associative memory arrangement (or a software implemented memory arrangement) that implements a table that identifies set of operations that need to be screened, and a set of parameters of such operations that need to be screened. Whenever and entry in the table is found, an appropriate error procedure to which this entry points will be invoked. For example, if a CONNECT operation with a destination that the network considers undesirable is received, the entry in the table in protocol screening module 411 will be found, in which an error action (in this case, sending a REJECT message to the appropriate protocol identification module) is specified.

A protocol identification module 404 is also included in SCF adapter 421, and a similar module, protocol identification module 426, is included in SSF/CCF adapter 422. Each of the protocol identification modules 404 and 426 receives SS7 signaling messages from the SCF or the SSF, as the case may be, performs any necessary translations, and sends messages back to the SCF or SSF. In order to perform these translations, protocol identification module 404 includes a protocol decoder 412, which, upon receiving a message, determines which INAP option should be invoked.

Using this information, messages passing through the protocol identification module 404 or 426 are routed to one of several modules in the protocol identification module. For example, each of the protocol identification modules 404 and 426 in FIG. 4 includes a first module 406 or 430 which identifies the CS-1 protocol, a second module 408 or 432 which identifies the AIN protocol, and a third module 410 or 434 which identifies the Core INAP protocol. Other modules may also be provided, and each of these modules can be plugged in or reprogrammed to realize appropriate INAP options. From the forgoing, it is seen that the protocol identification modules 404 and 426 allow the MAP to emulate the SSF/CCF behavior (at the SCF interface) and that of SCF (at the SSF/CCF interface).

An SS7 adapter 414 is provided between the SS7 interface 416 that connects the MAP to the SCF. This interface 416 is responsible for re-formatting messages according to the rules of the network protected by MAP and the one in which the SCF resides. This reformatting occurs, for example, for TCAP messages, and, if necessary, for SCCP and MTP messages. A local SS7 interface 440 is provided to interface the MAP with the SSF.

In lieu of the hardware realization of MAP 304 illustrated in FIG. 4, the MAP can also be implemented as a software application within a general purpose computer. It is to be noted, however, that a specialized hardware implementation generally results in improved performance.

There are several options that can be taken with respect to a software implementation of the present invention. In the most straightforward embodiment, SCF adapter 421 and SSF adapter 422 can be implemented as asynchronous processes, such as those that can be created within the UNIX® operating system. Protocol coordination function (PCF) module 402 can be implemented as a library of objects that contain (a) coordination objects (i.e., semaphores or monitors), as well as (b) the set of objects that perform the protocol message conversion from a canonic form to a specific form (such as CS-1, ETSI Core INAP, etc.) and vice versa. The behavior of the latter objects will then be governed by the state machines defined in ITU-T Recommendation Q.1218.

The rest of the modules which comprise adapters 421 and 422 can be implemented as object libraries, as follows. The protocol identification modules 404 and 426 can be implemented as objects with just one state variable each, which is set by protocol decoder 412 to determine which set of the translation routines is to be selected. SS7 adapter 414 can be implemented as an object with two functionalities, namely (1) send and (2) receive, the former invoked by protocol identification module 414, and latter invoked by protocol decoder 412.

In addition to the hardware implementation shown in FIG. 4, there are other possible hardware implementations for the present invention. For example, SSF/CCF and SCF adapters 422 and 421, respectively, can be implemented as two separate modules with four sockets each: two for connecting input and output to the SS7 network (or SS7 adapter 414, as in the case of the SCF), and two more for connecting input and output to the protocol coordination function module 402. Alternatively, both SSF/CCF and SCF adapters 422 and 421 could be connected to a bus shared with the protocol coordination function module 402 and, possibly, several external memory modules and I/O devices). As yet another alternative, the protocol coordination function module 402 can be a separate module connected to the SSF and SCF adapters, as described above. Still further, SS7 adapter 414 can be a separate module connected to the SSF adapter as described above.

Figure 5:
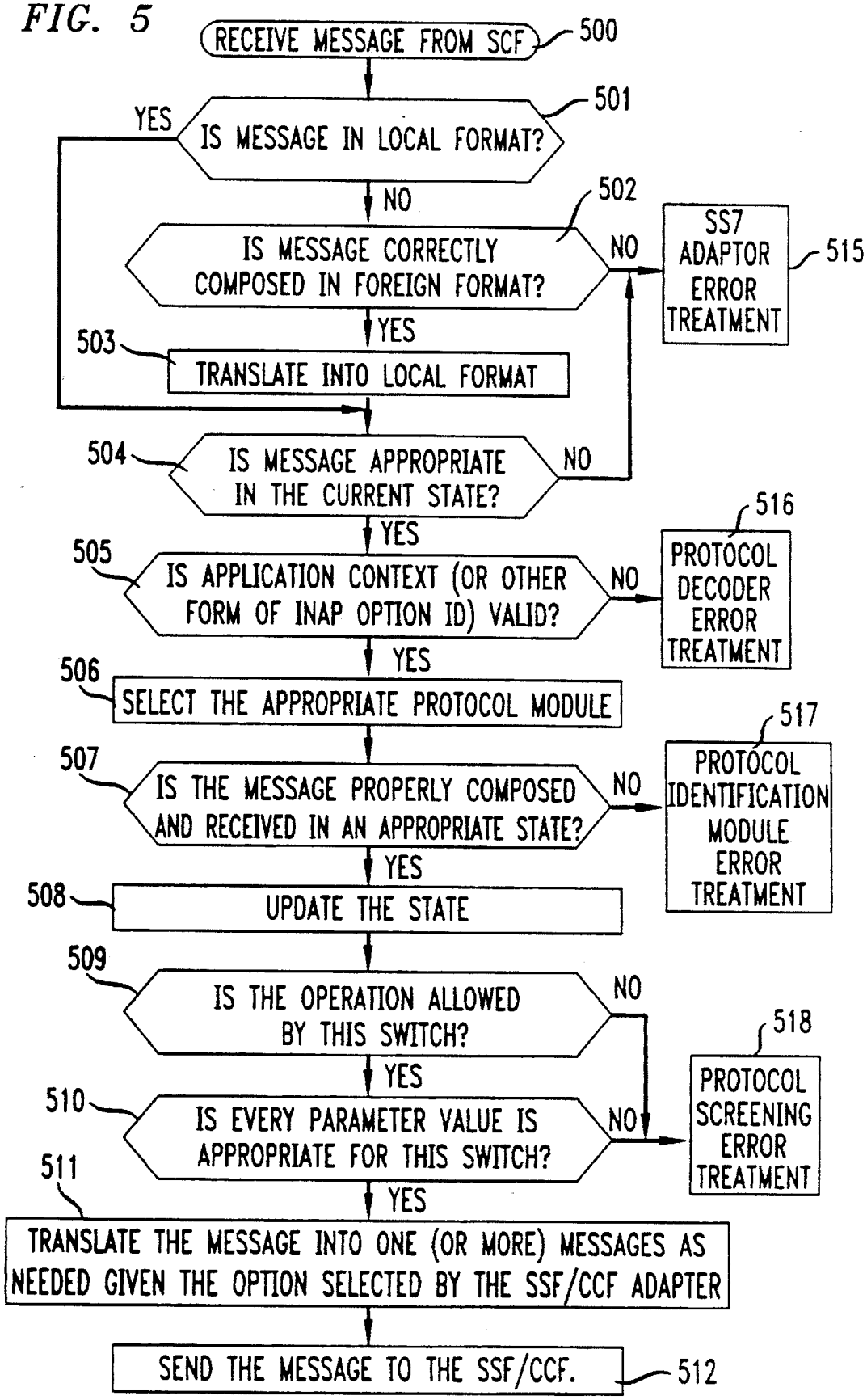
FIG. 5 is a diagram illustrating the process performed in MAP 304 of FIG. 3 when it receives a message from SCF 302 in Network A of FIG. 3.

Referring now to FIG. 5, there is shown a diagram illustrating the process performed in MAP 304 of FIG. 3 when it receives a message from SCF 302 in Network A of FIG. 3. The process begins in step 500, in which a message is received from the SCF (such as SCF 302 of FIG. 3). Next, in step 501, a determination is made in the SS7 adapter 414 as to whether the message is in local format. If not, the process proceeds to step 502, in which a determination is made also by SS7 adapter 414, as to whether the message is correctly composed in the foreign format. If a NO result occurs, the process proceeds to step 515, in which an error treatment is applied by SS7 adapter 414. This error treatment could consist of termination of certain local activities, as well as issuing an appropriate error control message to the SCF.

If a YES result occurs in step 502, the process proceeds to step 503, in which the message is translated in SS7 adapter 414 to local format for Network B. Next, in step 504, a determination is made as to whether the message is appropriate in the current state of the relevant SS7 protocol layer(s). If a NO result occurs, the process proceeds to step 515, in which error treatment is again provided by SS7 adapter 414.

If a YES result occurs in step 504, the process proceeds to step 505, in which a determination is made as to whether the application context (or other form of INAP option ID) is valid? If a NO result occurs, the process proceeds to step 516, in which error treatment is provided by protocol decoder 516. As in the previous case, this error treatment could consist of termination of certain local activities, as well as issuing an appropriate error control message to the SCF.

If a YES result occurs in step 505, the process proceeds to step 506, in which the appropriate protocol module is selected. This can be module 406, 408 or 410 in the embodiment shown in FIG. 4. Next, a determination is made in step 507 as to whether the message is properly composed and was received in an appropriate state of INAP. If a NO result occurs, error treatment is provided by protocol identification module 421 in step 517. This treatment could involve sending a TCAP reject message to the SCF.

If a YES result occurs in step 507, the state of the INAP, as specified in Section 3 of ITU-T Recommendation Q.1218, is updated in step 508, and the process proceeds to step 509 in which a determination is made as to whether the operation specified in the message is allowed by this switch. If a NO result occurs, error treatment is provided by protocol screening module 411 in step 518.

If a YES result occurs in step 509, a determination is next made in step 510 as to whether every parameter value is appropriate for this switch. If a NO result occurs, error treatment is also provided by protocol screening module 411 in step 518.

If a YES result occurs in step 510, the process proceeds to step 511 in which the current message is translated into one (or more) other messages, based upon the option selected by the SSF/CCF adapter 422. The process then proceeds to step 512, in which the translated message is sent to the SSF/CCF, in this example, SSF/CCF 306 of FIG. 3.

Figure 6:
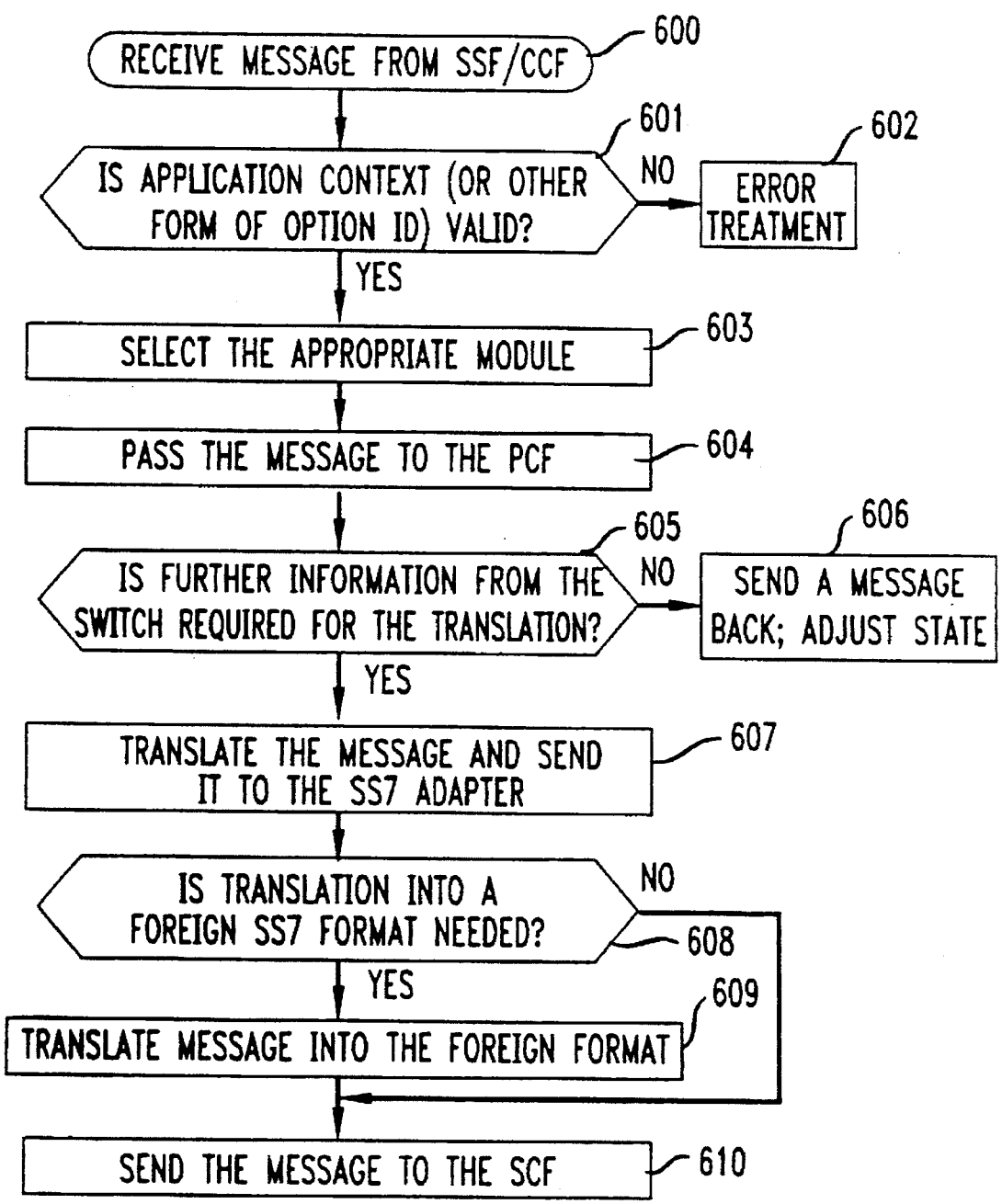
FIG. 6 is a diagram illustrating the process performed in MAP 304 of FIG. 3 when it receives a message from SSF/CCF 306 in Network B of FIG. 3.

FIG. 6 is a diagram illustrating the process performed in MAP 304 of FIG. 3 when it receives a message from SSF/CCF 306 in Network B of FIG. 3. The process begins in step 600, in which a message is received in MAP 304 from SSF/CCF 306 of FIG. 3. Next, in step 601, a determination is made as to whether the application context (or other form of option id) for this message is valid. If a NO result occurs, then error treatment is provided in step 602.

If a YES result occurs in step 601, the process proceeds to step 603, in which the appropriate module (i.e., module 430, 432 or 434) in protocol identification module 426 is selected. Then, in step 604, the message is passed to the protocol coordination function module 402. Next, a determination is made in step 605 as to whether further information from the switch is required for the translation. If a NO result occurs, then, in step 606, a message is sent back to SSF/CCF 306, and the state of the system (i.e., the state of the INAP, as specified in Section 3 of ITU-T Recommendation Q.1218) is adjusted.

If a YES result occurs in step 605, the process proceeds to step 607, in which the message is translated and sent to the SS7 adapter 414. Next, in step 608, a determination is made as to whether a translation into a foreign SS7 format needed. If a YES result occurs, the message is translated into the foreign format in step 609, and the process proceeds to step 610, in which the message is sent to the SCF, in this example, SCF 302 of FIG. 3. If a NO result occurs in step 608, the process skips step 609 and proceeds directly from step 608 to step 610, as translation is not required.

Various modifications and adaptations of the present invention will be apparent to those skilled in the art. For that reason, it is intended that the invention be limited only in accordance with the following claims.

What is claimed is:

1. An intelligent network internetworking access system for interconnecting first and second networks, comprising
   a mediation access processor (MAP) located in said first network, and
   means for connecting said MAP to other elements in said first network and to network elements in said second network,
   wherein said MAP includes modules for (a) screening messages transmitted in one direction between elements in said first network and elements in said second network, and (b) emulating, with respect to said first network, elements in said second network, and with respect to said second network, elements in said first network.

2. Apparatus for interconnecting first and second networks so that intelligent network services can be provided to a caller connected to said first network using call processing logic residing in said second network, said apparatus comprising
   at lease one switch in said first network adapted to receive a call from said caller;
   at least one network element in said second network arranged to store said call processing logic;
   a mediation access processor (MAP) located in said first network; and
   means for connecting said MAP to said switch in said first network and to said network element in said second network;
   wherein said MAP is arranged so that messages transmitted between said switch in said first network and said network element in said second network are converted so as to be recognized and understood by said network element.

3. The invention defined in claim 2 wherein said network element is a Service Control Point (SCP).

4. The invention defined in claim 3 wherein messages between said switch and said MAP are in a first format and messages between said MAP and said network element are in a second format.

5. The invention defined in claim 4 wherein said first format is AIN (Advanced Intelligent Network) 0.1 INAP (Intelligent Application Network Protocol), and said second format is ETSI (European Telecommunications Standards Institute) CORE INAP.

6. The invention defined in claim 2 wherein said MAP (Mediation Access Processor) is disposed within an SCP (Service Control Point) in said first network.

7. The invention defined in claim 2 wherein said MAP (Mediation Access Processor) includes a screening module arranged to protect the network from unwanted or erroneous messages, and protocol identification and coordination modules arranged to translate messages from one INAP (Intelligent Application Network Protocol) option to another.

8. The invention defined in claim 2 wherein said MAP (Mediation Access Processor) operates a SSF/CCF (Service Switching Function/Call Control Function) to SCF (Service Control Function) interface as though it is an SCF, and operates at the SCF to SSF/CCF interface as though it is an SSF/CCF.

9. The invention defined in claim 2 wherein said MAP (Mediation Access Processor) includes an SCF (Service Control Function) adapter and an SSF (Service Switching Function) adapter.

10. The invention defined in claim 9 wherein said SCF (Service Control Function) adapter and SSF (Service Switching Function) adapter are interconnected to each other through a PCF (Protocol Coordination Function) module that performs a protocol coordination function.

11. The invention defined in claim 10 wherein said protocol coordination function performed by said PCF (Protocol Coordination Function) includes translation of one protocol into another protocol.

12. Apparatus for interconnecting first and second networks so that intelligent network services can be provided to a caller connected to said first network using call processing logic residing in said second network, said apparatus comprising
at least one switch in said first network adapted to receive a call from said caller;
at least one network element in said second network arranged to store said call processing logic,
a mediation access processor (MAP) located in said first network,
means for connecting said MAP to said switch in said first network and to said network element in said second network,
wherein said MAP is arranged to provide emulation.

13. An intelligent network internetworking access method for interconnecting first and second networks, comprising the steps of
connecting a mediation access processor (MAP) located in said first network to other elements in said first network and to network elements in said second network,
screening messages transmitted in one direction between elements in said first networks and elements in said second network in a first module in said MAP, and
emulating, with respect to said first network, elements in said second network, and with respect to said second network, elements in said first network.

14. A method for interconnecting first and second networks so that intelligent network services can be provided to a caller connected to said first network using call processing logic residing in said second network, said method comprising the steps of receiving a call from said caller in at least one switch in said first network;
storing said call processing logic in at least one network element in said second network; and
connecting a mediation access processor (MAP) located in said first network to said switch in said first network and to said network element in said second network;
wherein said MAP is arranged so that messages transmitted between said switch in said first network and said network element in said second network are converted so as to be recognized and understood by said network element.

15. The method defined in claim 14 wherein said network element is a Service Control Point (SCP).

16. The method defined in claim 15 wherein messages between said switch and said MAP (Mediation Access Processor) are in a first format and messages between said MAP and said network element are in a second format.

17. The method defined in claim 16 wherein said first format is AIN (Advanced Intelligent Network) 0.1 INAP (Intelligent Application Network Protocol), and said second format is ETSI (European Telecommunications Standards Institute) CORE INAP.AIN 0.1 INAP.

18. The method defined in claim 14 wherein said MAP (Mediation Access Processor) is disposed within an SCP (Service Control Point) in said first network.

19. The method defined in claim 14 further including the steps of
screening messages in said MAP (Mediation Access Processor) to protect the network from unwanted or erroneous messages, and
translating messages from one INAP (Intelligent Network Application Protocol) option to another in protocol identification and coordination modules.

20. The method defined in claim 14 wherein said MAP (Mediation Access Processor) operates at the SSF/CCF (Service Switching Function/Call Control Function) to SCF interface as though it is an SCF, and operates at the SCF to SSF/CCF interface as though it is an SSF/CCF.

21. The method defined in claim 14 wherein said MAP (Mediation Access Processor) includes an SCF (Service Control Function) adapter and an SSF (Service Switching Function) adapter.

22. The method defined in claim 21 wherein said SCF (Service Control Function) adapter and SSF (Service Switching Function) adapter are interconnected to each other through a PCF (Protocol Coordination Function) module that performs a protocol coordination function.

23. The method defined in claim 22 wherein said protocol coordination function performed by said PCF (Protocol Coordination Function) includes translation of one protocol into another protocol.

24. A method for interconnecting first and second networks so that intelligent network services can be provided to a caller connected to said first network using call processing logic residing in said second network, said method comprising the steps of
receiving a call from said caller in at least one switch in said first network;
storing said call processing logic in at least one network element in said second network;
connecting a mediation access processor (MAP) located in said first network to said switch in said first network and to said network element in said second network; and
arranging said MAP to provide emulation.

* * * * *